Patented Apr. 20, 1937

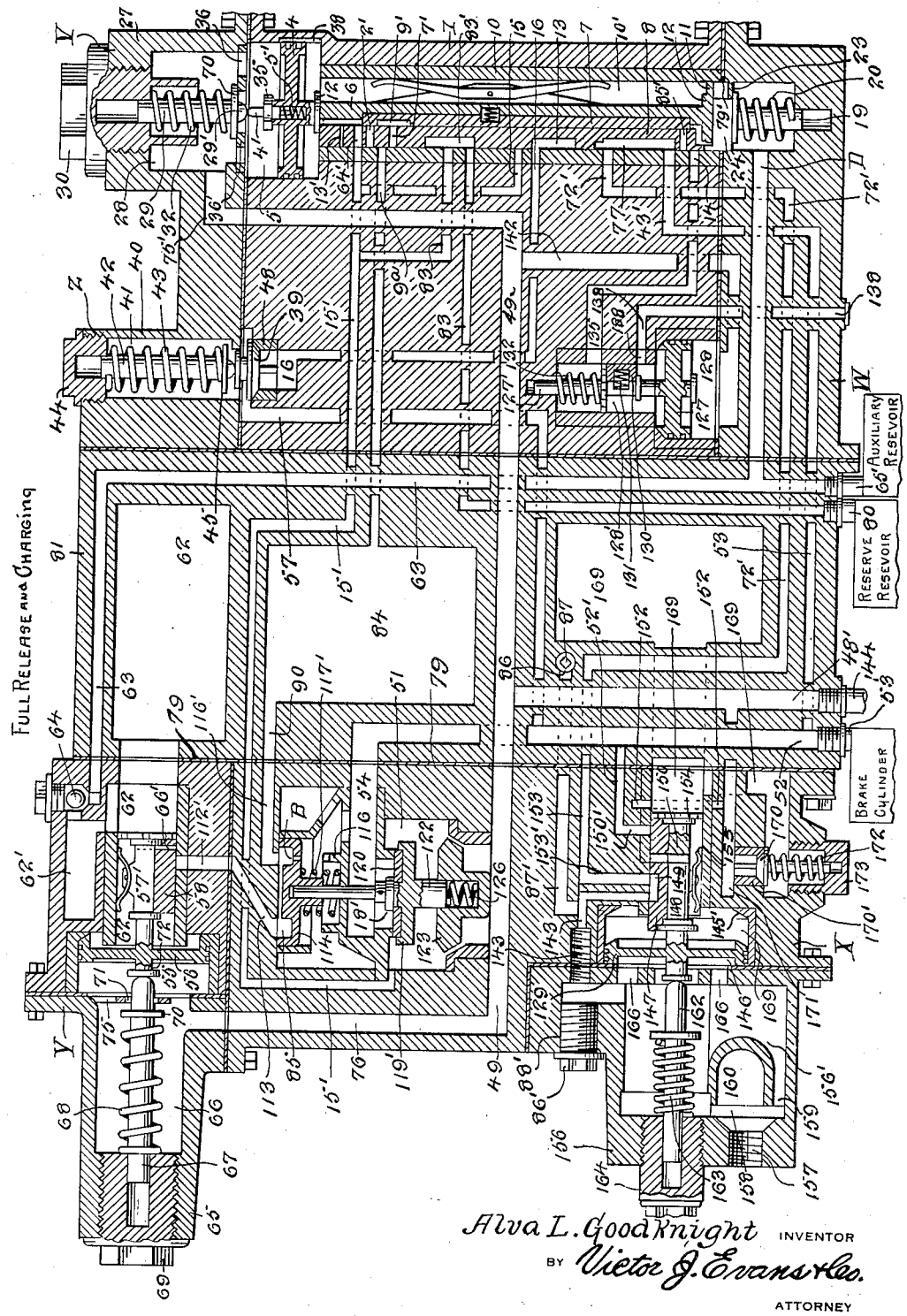

2,077,787

UNITED STATES PATENT OFFICE 2,077,787

AIR BRAKE MECHANISM

Alva L. Goodknight, Fort Worth, Tex.

Application September 8, 1934, Serial No. 743,172

13 Claims. (Cl. 303—27)

This invention relates to air brake mechanism of the general type described in my prior Patents #1,736,910, dated November 26, 1929 and #1,835,999, dated December 8, 1931.

Broadly the invention seeks to provide air brake mechanism wherein all of the component elements function in such a manner as to afford sufficient and positive braking action at all times, and in which sufficient pressure is maintained for any emergency notwithstanding excess air dissipation by the engineer or operator thereby providing a safe, dependable brake mechanism capable of meeting every emergency.

A certain standard of efficiency is required in the braking facilities of modern steam railways, as well as electric and motor transportation, and it is the primary purpose of this invention to meet such requirements and provide a simple and economical, yet durable construction which will enable expert operation by persons of average experience and training and which will eliminate the possibility of expanding and dissipating air pressure to the danger point, and which will maintain at all times a sufficient pressure to stop a train or other vehicle in a normal manner without skidding the same, and which will further prevent application of the service or emergency mechanism when not intended.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification

The figure is a diagrammatic sectional view of a brake controlling valve device constructed in accordance with the invention and showing the parts in normal release position.

Briefly, this invention presents three novel features and their construction and advantages will be described, explained, and stressed in the following specification, as:

First, when the brakes are operated, by, for example, 100 pounds pressure more or less, a brake cylinder maintaining device will compensate for brake cylinder leakage and maintain brake cylinder pressure direct from the brake pipe without the brake cylinder becoming overcharged with excess pressure from the brake pipe.

Second, after the brakes have been released, if the auxiliary reservoir becomes overcharged and the main slide valve of the triple valve portion begins to creep over and apply the brakes, an auxiliary reservoir deplete device will vent the excess auxiliary reservoir pressure to the atmosphere and positively prevent accidental application of the brakes.

Third, when the brakes are emergency applied the brake cylinder and auxiliary reservoir equalizes with pressure of from 60 to 65 pounds which is 10 or 15 pounds excess pressure above the usual normal 50 pounds. Immediately following this operation a brake cylinder exhaust control device reduces the excess brake cylinder pressure in a chamber, in the brake cylinder, and in the auxiliary reservoir, such pressure release being made into the brake pipe whereby to facilitate a prompt brake release.

Referring now to the drawing, the invention is shown to comprise substantially five main devices which will be hereinafter referred to as the triple valve device V, auxiliary reservoir deplete device W, brake cylinder exhaust control device X, emergency valve device Y, and brake cylinder maintaining device Z.

Triple valve device

The triple valve device V comprises a housing 1 containing the main slide valve assembly which includes a piston 4 in the piston chamber 5, a piston stem 6, an auxiliary slide valve 7, and a main slide valve 8. The main slide valve is provided with the cavities 77, 13, and 83', and also is provided with charging ports 13' and 64', also with quick service ports 2' and 7', and also with a service port 85'. The auxiliary slide valve 7 is provided with a cavity 9'.

The piston stem 6 is provided with a collar 12 which moves the main slide valve 8 when a reduction in brake pipe pressure is made. The piston stem is pressed by a helical spring 20 disposed on a pin 19. Movement of the piston stem against the tension of the spring, when a release is made, is limited by contact of a guide 11 with a stationary projection 23. The pin terminates in an abutment 24 which maintains the main slide valve 8 in position for full release by reason of the spring 20 shoving the abutment back after auxiliary reservoir pressure has equalized with brake pipe pressure.

A feed groove 38 in the housing 1 forms a bypass around the piston 4 from the piston chamber 5 into the main slide valve chamber 10'. The piston is provided with an axial housing for a plunger 4', which is spring pressed outwardly by a spring 5'. Exteriorly of the valve a stop lug 35 is formed integral with the piston for depressing the stop pin 29 under certain conditions.

The stop pin 29 engages the plunger with its tip 29'. A helical spring 32 surrounds the stop pin and in release position of the parts holds a collar 79 on the pin in engagement with a stop disc 36' having perforations 36 therein to establish communication between the piston chamber 5 and pin chamber 28.

Auxiliary reservoir deplete device

The auxiliary reservoir deplete device W comprises a piston 127 working in the piston chamber 128 and having a stem 127' upon which a slide valve 130 is flexibly mounted by means of a helical spring 131. The slide valve is mounted between spaced collars on the piston stem. At any time when brake pipe pressure in the chamber 128 exceeds auxiliary reservoir pressure in the chamber 128' plus pressure of a spring 132, the piston moves the slide valve to uncover a passage 138 which leads to the atmosphere for venting the auxiliary reservoir to the atmosphere. One of the collars is perforated so that auxiliary reservoir pressure from a passage 135 may enter the chamber 128' on both sides of the valve.

Brake cylinder exhaust control device

The brake cylinder control exhaust device X comprises a piston 129 working in a chamber 146. The stem 148 of the piston is provided with a slide valve 147 having a cavity 149 therein. The piston stem is also provided with a passage 150 which extends through the slide valve. In full release position of the parts the passage 150 is out of registration with a passage 150' which leads to the brake cylinder, as will presently be described, but the passage 150 registers with the passage 150' when the brake pipe pressure has dropped below approximately 50 pounds to connect the brake pipe direct to the brake cylinder. The slide valve 147 also controls a passage 152 which curves around the slide valve housing and communicates with a passage 171 that is controlled by a check valve 170 and that opens into the brake pipe 144. The cavity 149 connects passages 153 and 153' which connect the brake cylinder to the atmosphere through the triple valve assembly V in full release position.

The piston 129 is held at one limit of its movement by brake pipe pressure in a chamber 169 which opens into the slide valve housing as shown. This chamber 169, it will here be stated, contains brake pipe pressure when the brakes are released but contains brake cylinder pressure when the brakes are applied.

A pin 162 is slidably mounted in a chamber 156' and is held pressed against the piston 129 by means of a helical spring 163. The spring is under a tension of about 50 pounds. Thus it will be compressed by greater than about 50 pounds pressure in the chamber 169. When the pressure in the chamber 169 is less than 50 pounds the spring 163 will move the piston 129 to carry the slide valve 147 to application position in which position the passage 150 will register with the passage 150' and the valve will seal passage 152 as well as seal the passages 153 and 153'.

Emergency valve device

The emergency valve device Y comprises a piston 56 which works in a chamber 55. The piston is provided with a stem 57' having spaced collars thereon between which is mounted a slide valve 58 which seals a passage 112' in the slide valve housing when the parts are in full release position, as shown. The slide valve is provided with an equalizing port 66'. A pin 67 is mounted in a chamber 66 which is in communication with the piston chamber 55 through openings 75 in the pin guide 71. A spring 68 of about 10 pounds tension, surrounds the pin and urges the pin against a projection 72 on the piston.

A quick action chamber 62 in the bracket 81 is in communication with the valve housing, and the fluid pressure in the chamber is exerted against the piston 56 in opposition to the pressure of the spring 68. The chamber 62 is in communication with the auxiliary reservoir through passage 63 past check valve 64, and chamber 62'. The chambers 66 and 55 are in communication with the brake pipe through passages 76 and 49. Consequently when a reduction of pressure, for instance of more than 10 pounds is made in the brake pipe and in the chamber 55, the pressure in the quick action chamber 62 will move the piston 56 until the port 66' in the slide valve registers with the passage 112' whereupon the pressure in the chamber 62 will reduce through the passage 112' until it reaches an excess pressure of about 10 pounds more than the pressure in the brake pipe, due to the spring 68 exerting a pressure of about 10 pounds against the piston 56.

The passages 112'—113 open into the chamber 85 of a vent piston 114 which is provided with a port B that communicates with passages 54—53 leading to the brake cylinder. Pressure in the quick service chamber 62, reducing through the passage 112' when the port 66' in the valve 58 registers, will pass through the chamber 85, port B, passages 54—53 to the brake cylinder.

The piston stem carries a vent valve 119' which controls a passage 18' leading through passages 54 and 53 to the brake cylinder. The vent valve works in a chamber 51 which is controlled by a valve 123 that is slidably mounted on the stem 122 of the vent valve. The spring 126 is interposed between the stem 122 of the vent valve and the check valve 123 and tends to constantly hold the check valve 123 and the vent valve 119' closed. The check valve controls brake pipe pressure from the passage 48' into the chamber 51.

During emergency application, when pressure from the quick action chamber 62 moves the piston 56 to its limit of movement, the slide valve 58 will be moved to unseal the passage 112' and air in large volume will travel from the quick action chamber through the passages 112'—113 and move the vent piston 114 against the tension of its controlling spring 117'. This movement of the piston opens the vent valve 119' whereupon brake pipe pressure from the passage 48' will open the check valve 123 and permit brake pipe pressure to flow in large volume into the chamber 51 past the valve 119' into the passages 18', 54 and 53 to the brake cylinder.

A quick service chamber 84 in the bracket 81 is in communication with the piston chamber 85 through passages 116'—90. The quick service chamber also communicates with a passage 9ª which is controlled by the valve assembly 7—8 of the triple valve device V.

In full release position the quick service chamber 84 is in communication with the atmosphere through 90—116'—85—B—54—53 and brake cylinder. During quick service application the chamber 84 is subjected to a definite volume of brake pipe air through passage 48'—49, open check valve 123, passage 15', port 2', cavity 9' of main slide valve assembly 7—8, and passage 9ª.

Brake cylinder maintaining device

The brake cylinder maintaining device Z comprises a check valve 39, the stem of which abuts a pin 42 which is slidably mounted in a chamber 41. A spring 43 surrounds the pin and exerts a pressure of about 50 pounds on the check valve 39. A passage 52 leads from the brake cylinder to a passage 57 which communicates with the chamber 41. The check valve 39 closes a passage 16 which is controlled by the position of the cavity 13 of the triple valve device V, the cavity 13, under service or emergency application, connecting the passage 16 with a passage 15 which leads into the passage 15' then to the brake pipe through the check valve 123 and passage 48'.

During service application brake pipe pressure in the chamber 16, say, 60 pounds, will overcome the 50 pound tension of the spring 43 and will permit 10 pounds brake pipe pressure entering the brake cylinder through the passages 57—52. The brake cylinder pressure in the chamber 41, 10 pounds, plus the pressure of the spring 43, 50 pounds, will close the check valve 39. Should, however, there be leakage with consequent reduction from the 10 pounds pressure in the brake cylinder the check valve 39 will again be opened as above described to compensate for this loss of pressure.

When a retainer is to be used the plug 87 is transferred to the port 143 to pass the exhaust through the port 86 to the retainer. When this is done the plug 86' is transferred to the vent opening 157, and in this position dirt collecting in the chamber 156' will be vented through the opening 88'.

Charging

On the front end of the train where production is immediately felt the piston 4 moves at full transverse into retarded release and restricted recharge position to close the feed groove 38. Brake pipe pressure now flows through passage 48' past check valve 123 to passage 15' to port 13', to main slide valve chamber 10'. When the auxiliary reservoir pressure becomes substantially equal to the brake pipe pressure, the spring 20 shoves the main slide valve and piston assembly back to full release position as shown in the figure and now brake pipe pressure can also flow from passage 48'—75' to chamber 5, through now open feed groove 38 into the main slide valve chamber 10'.

Fluid from the auxiliary reservoir and its chamber 10' flows through passage D—63 past check 64 into quick action chamber 62'—62. Piston 56 remains in the position shown because of the presence of brake pipe pressure flowing from passages 48' and 49 to passage 76 into chamber 66 of the emergency piston assembly and pressure of spring 68 in chamber 66. Fluid under pressure also flows from passage D through pipe 65' to the auxiliary reservoir 65'. When pressure in chamber 10' approaches that in chamber 5 spring 20 shifts the main piston assembly 4—6—7—8 into the position shown. Feed groove 38 is open. Communication with passage 15' and chamber 10' is maintained by slide valve port 64'.

The brake cylinder is connected to the atmosphere as follows: brake cylinder pipe 53, passage 54—43', cavity 77 in main slide valve 8, passage 72'—153, cavity 149 of the direct air piston assembly 147—148—129, passage 153', chamber 156' and port 157. Brake pipe pressure also flows from passage 48'—75' to passage 142 into chamber 128 of the deplete valve assembly 127—130 moving it into the position shown so that passage 135 is connected to the atmosphere via passage 139. Brake pipe pressure also flows from passage 15' via passage 83, cavity 83', passage 83 to reservoir chamber 80. Brake pipe air also flows from pipe 144 to passage 171 past check valve 170 into chamber 169. When the pressure in chamber 169 reaches a value sufficient to compress spring 163 (about 50 pounds) the piston 129 moves into the position shown to connect the brake cylinder passage 153 to the atmosphere, as already described.

Service operation

Reduce brake pressure from 70 pounds to 60 pounds.

Main piston assembly moves first to close feed groove and port 83, connect quick service ports 2' and 7' in main slide valve 8 via cavity 9' in auxiliary slide valve 7 and open service port 85' in main slide valve. Thereafter main assembly moves into quick service position with ports 85' and 43' partly open to apply the brake with reservoir and quick service pressures (e. g. piston lug 35 abuts stop 29' without compressing same). The brake pressure is vented to the quick service chamber 84 via 15'—2'—9'—7'—9ª and also into the quick action piston chamber 85 through ports 90 and 116'. Some of the air may leak through port B to brake cylinder passage 53. This will propagate the quick service brake application by venting the brake pipe in a chamber of fixed volume. The main valve assembly then moves to service position wherein spring pressed stop pin 29 is partly overcome. The brake pipe is now connected to the brake cylinder via 15'—15, cavity 13—16, past check valve 39, passage 57—52' and 52 to brake cylinder pipe 53. In this position the auxiliary reservoir is fully connected to the brake cylinder 53 via main slide valve service port 85' and passage 43'. The auxiliary reservoir is also connected to chamber 128' of the deplete valve 130 via port 14 in the main slide valve seat and connected passage 135 by movement of the main slide valve from release position. Chamber 128' has been isolated from the atmosphere in view of movement of piston 127 and its associated valve 130 under influence of reduced brake pipe pressure and auxiliary reservoir pressure admitted to said chamber. This conditions the deplete valve for a function hereinafter described. Upon equalization of the auxiliary reservoir with the brake pipe the piston 4 will move the auxiliary slide valve 7 to lap position to close the service port 85'. The cavity 13 still maintains the connection of the brake pipe to check valve chamber 16. If brake cylinder pressure is diminished by leakage to a value less than 10 pounds the check valve 39 will act to charge the brake cylinder from the brake pipe back to 10 pounds in a manner now described. Spring 43 seats valve 39 with a force of approximately 50 pounds. Train pipe pressure in chamber 16 is 60 pounds, e. g. said train pipe pressure having been reduced from 70 pounds to 60 pounds. Thus if the brake cylinder pressure present in chamber 41 plus the tension of spring 43 is less than 60 pounds the check valve will be unseated by the 60 pound brake pipe pressure to bring the brake cylinder up to a value sufficient to close said valve, in this case back to 10 pounds.

It may thus be seen that there will be maintained in the brake cylinder at all times during service a pressure equal to the difference between the value of spring 43 and the reduced brake pipe pressure provided the brake pipe pressure is not reduced to a value less than spring 43, e. g. 50 pounds. The emergency piston assembly will move, during service, just sufficiently to bleed the quick action chamber 62—62' into the quick service chamber and brake cylinder via port 66' and passages 112', 113 and port B at a rate commensurate with a service rate of brake pipe reduction. This prevents a sufficient pressure differential from building upon piston 56 to move same into emergency position.

If the auxiliary reservoir and brake cylinder pressure has been depleted to a point where it is no longer possible to admit fluid under pressure to the brake cylinder by a reduction in brake pipe pressure the brake cylinder pressure may be maintained directly by the engineer in the following manner. After the brake pipe pressure has been reduced to 50 pounds the auxiliary reservoir will have equalized with the brake cylinder. No further air may then be supplied from the auxiliary reservoir to the brake cylinder. However, when brake pipe pressure is reduced by the engineer to a value less than 50 pounds piston 129, under influence of about 50 pounds spring 163, will move to the right. This will connect the brake pipe directly to the brake cylinder through the following passages, brake pipe 144—48'—171 past check valve 170, chamber 169, port 150 and 150' connected to brake cylinder passages 52' and 52. It may thus be seen that the engineer may maintain the brakes applied by supplying air directly thereto in all cases where the brake pipe pressure is less than value of spring 163.

The maintained pressure may be any value less than 50 pounds e. g. 10, 20, 30, etc. To release the brake it is necessary to increase brake pipe pressure since the main piston assembly performs the release function.

*Release after service*

To release the brakes the engineer places the engineer's valve in the usual position to supply air to the brake pipe. When the brake pipe pressure reaches a value of 50 pounds the direct air valve assembly 147—168 moves to the left or release position disconnecting the brake cylinder from the brake pipe. Rising brake pipe pressure will also be effective on the main piston assembly to move same to release position. Also when brake pipe pressure is slightly greater than the reduced auxiliary reservoir pressure effective on piston 127 it will move to the right to vent auxiliary reservoir. This venting will continue until the main assembly moves to release after which main slide valve blanks port 14 to prevent waste of air. Movement of the main valve assembly connects the brake cylinder to atmosphere via passage 43', exhaust cavity 77, passage 72'—153, cavity 149, passage 153'—87' to the usual retainer valve connection 86.

Movement of the main slide assembly to release position also connects the reservoir chamber 89 to the auxiliary reservoir via passage 83 opening into the main slide valve seat. This will aid a rapid recharge of the auxiliary reservoir by equalizing therewith. Thereafter the auxiliary reservoir, reserve chamber and quick action chamber are charged from the brake pipe in the already described manner.

It is to be noted that final exhaust of brake cylinder pressure is under control of the direct air valve. The purpose of this is to prevent release of the brakes when the direct air valve is in application position because of depletion of auxiliary reservoir pressure or unintentional movement of the main valve to release position when controlling the brakes directly.

If the auxiliary reservoir should become overcharged, the main valve 8 will creep slowly under influence of such excess pressure and uncover ports 14—135 and the deplete valve 130 has the vent port 138 open thereby permitting the excess pressure to vent slowly to the atmosphere until normal pressure of 70 pounds is retained in the reservoir.

*Emergency*

When an emergency reduction in brake pipe pressure is initiated the main valve assembly moves its full traverse to the left. In this position main slide valve 8 connects the brake pipe with valve chamber 16 via brake pipe passage 48' past check valve 123, passage 15', 15, cavity 13 and passage 16. The result is to vent brake pipe air to the brake cylinder until the combined force of spring 43 and brake cylinder pressure in chamber 41 is equal to the force of brake pipe air pressure present in chamber 16 acting on check valve 39. Also the main slide valve 8 has opened a restricted communication between the auxiliary reservoir and the brake cylinder e. g. passage 43' is not fully opened by the tail portion of said slide valve. Thus during this first period there is a relatively slow flow of air from the brake pipe and auxiliary reservoir to the brake cylinder.

When the brake pipe drops to a value approximately 10 pounds below the initial pressure the emergency piston assembly moves to the left (spring 68 exerting a force of approximately 10 pounds on the piston assembly) to establish an unrestricted communication between the quick action chamber 62—62' via passages 112' to the top of quick action piston 114. Piston 114 then acts to open valve 119' to provide an unrestricted flow of air to the brake cylinder from the brake pipe. This flow will continue until the brake pipe pressure equalizes with that in the brake cylinder at which time check valve 123 acts to prevent any reverse flow. This second period acts to accelerate the rate of build up of brake cylinder pressure commensurate with the volume of air vented thereunto from the brake pipe. Thereafter (3rd period) brake cylinder pressure continues to build up at a rate less than the initial rate by an amount depending upon the quantity of air that was supplied by the now inactive check valve 39 and the retarded auxiliary reservoir pressure held back by the restricted port 43'.

It may be seen that in emergency there are three rates of charge for the brake cylinder. The first period permits the gathering of slack since final venting of the brake pipe into the brake cylinder is delayed until the second above described period. In the third period equalization between the auxiliary reservoir and brake cylinder takes place at a rate determined by the opening of port 43'. This equalization pressure is approximately sixty five pounds. The direct air valve assembly acts, when the brake pipe is vented as in an emergency, to bleed this pressure down to fifty pounds as follows. When brake pipe pressure drops to a value less than fifty pounds piston 129 moves to the right under influence of spring 163 to isolate the brake pipe from chamber 169. The brake cylinder is then connected to chamber 169 via passage 52—52', 150' and port 159. Since the brake cylinder pressure is approximately 65 pounds the flow of air into chamber 169 will build up until it is slightly in excess of fifty pounds, the value of spring 163. This piston 129 will then move to the left causing slide valve 147 to blank the brake cylinder passage 150' and connect chamber 169 to the now vented brake pipe chamber 171 through port 152. When chamber 169 has vented piston 129 will again move to the right to continue its cycle operation until brake cylinder pressure has dropped to a value such that spring 163 can no longer be overcome.

Since the auxiliary reservoir is connected to the brake cylinder through ports 85' and 43' while the main piston assembly is in application position it too will be reduced to fifty pounds pressure. The purpose of this reduction in equalization pressure is to enable a ready quick release of the brakes to be obtained. That is to say with this device it is only necessary to raise the brake pipe pressure to slightly above fifty pounds to effect release instead of sixty five pounds. Likewise should the main assembly fail to move into release position immediately the automatic deplete valve will act to vent the auxiliary reservoir as described under "Release after service". To release the brakes after an emergency brake application the usual brake valve would be operated to charge the brake pipe. The mechanism will then operate as described in "Release after service".

The quick service feature operates the same in high abnormal as it does in normal pressure and in the quick service operation the compensation valve 39 is not yet cut in. Reference is had to the accompanying figure. To bring about a service and compensation application of the brakes when operating, for example, with 100 pounds brake pipe, auxiliary reservoir and 120 pounds of main reservoir pressures, a reduction of 10 pounds of brake pipe pressure to the atmosphere with the engine brake valve is made more rapidly than that of the auxiliary reservoir flows through the port 85' and passage 43' into the brake cylinder 53. The difference in pressure on both sides of the piston 4 soon becomes sufficient to move the piston 4 and its valves 7 and 8 towards the spring pressed stem 29.

The piston 4 compresses the graduating spring 32 and causes the valve 8 to move enough to register the port 85' fully open with the port or passage 43' and thus permit a like amount of pressure, which is 10 pounds of auxiliary reservoir pressure, to reduce into the brake cylinder. The auxiliary reservoir being much larger than the brake cylinder, will cause the 10 pounds reduction of pressure from the former into the latter to develop to approximately 25 pounds pressure (more or less), in combination with the compensation pressure flowing into the brake cylinder from the brake pipe passage 49 through the compensation ports 15', 15, cavity 13 and port 16, lifts valve 39, compresses spring 43, passes through ports 57 and 52 and thus assists auxiliary reservoir pressure in applying the brakes. In this position the quick service ports 15', 2', and 9ª, are closed so that no more pressure from the brake pipe can flow through these ports to the brake cylinder.

The port 83 is held blank, yet retaining the 100 pounds of abnormal pressure in the reserve chamber 80. The by-pass cavity 13 connects port 15 with port 16. The compensation valve 39 is thus connected to port 15' (see figure). The abnormal brake pipe pressure in passage 49 will then force the valve 123 to rise from its seat and flow into chamber 51 through ports 15', 15, cavity 13, thence through port 16 to the valve 39. It will then lift the valve 39, compress spring 43 and pass into chamber 41, then through passages 57 and 52 and thence into the brake cylinder 53, which causes a local direct reduction of brake pipe pressure through the latter ports and passages into the brake cylinder to accelerate the propagation of the application and thus continues to apply the brakes with a greater brake cylinder pressure until the brake pipe, auxiliary reservoir and brake cylinder pressures, plus the spring 43 resistance, equalize, which is approximately 86½ pounds of air pressure in the brake pipe and auxiliary reservoir and 36½ pounds of air pressure, plus the 50 pounds resistance of spring 43 in the brake cylinder chamber 41 and its connected brake cylinder 53. The valve 39 will then close. If there should be any brake cylinder leakage, it will then open and compensate for the same and hold the brakes set with air pressure direct from the brake pipe (see figure). The brakes can then be released and immediately reapplied with another full application without recharging the brake pipe and auxiliary reservoirs up to 100 pounds pressure. This manner of operating the brakes is taken advantage of upon heavy descending mountain grades. It will thus be understood that no excess pressure above 50 pounds can reach the brake cylinders from the brake pipe during the above described service operations.

The auxiliary reservoir deplete valve 130 operates the same in abnormal service or emergency as it does in the described normal 70 pound service or emergency brake pipe and auxiliary reservoir operating pressures. The high pressure emergency application is accomplished in the same usual described manner with a greater brake cylinder pressure gained while operating with the high pressures than when operating with normal pressures.

The release of the brakes is accomplished in the usual described manner while operating with abnormal high pressure. The exhaust control valve 147 will automatically reduce the emergency excess pressure from the brake cylinder and bleed the auxiliary reservoir high pressure into the former and its chamber 169, then automatically reduce the excess pressure from the chamber and brake cylinder into the brake pipe when the pressure in the latter is slightly below the pressure in the chamber 169 and the brake cylinder 53 to permit the exhaust control valve device X to reduce the pressure in the usual manner for a ready quick release of the brakes. The auxiliary reservoir deplete valve device will function the same when operating with high abnormal pressure for example, 100 pounds brake pipe and auxiliary reservoir pressures as it does with the normal brake pipe and auxiliary reservoir 70 pounds pressures.

From the above description it is thought that the construction and operation of the invention will be fully understood without further explanation.

What is claimed is:

1. In an automatic air brake, in combination, a brake pipe, a brake cylinder, an auxiliary reservoir, and a triple valve device operative upon an emergency reduction in brake pipe pressure to equalize the auxiliary reservoir with the brake cylinder, and automatic means for then connecting the brake cylinder to the brake pipe whereby, the equalized pressure is reduced to a predetermined value in a series of steps into the brake pipe to facilitate prompt release.

2. In an automatic air brake, in combination, a quick action chamber, an auxiliary reservoir, a check valve controlled passage leading from the auxiliary reservoir to the quick action chamber, and means for releasing excess pressure from the auxiliary reservoir to the atmosphere when overcharged.

3. In an automatic air brake, in combination, a brake pipe, a triple valve, an auxiliary reservoir, a reserve reservoir and a quick action chamber adapted to be charged from the auxiliary reservoir, through a one way check valve, an emergency valve device responsive to brake pipe and quick action chamber pressures, means incorporated in said emergency valve device to slowly vent the quick action chamber of abnormal high pressure resulting from an overcharge into the brake cylinder and thereby to the atmosphere when the triple valve is in release position, and means subject to brake pipe and quick action chamber pressures to maintain normal pressure in the quick action chamber after a quick service and service reduction in brake pipe pressure, said means responsive to a further reduction in brake pipe pressure to cause the full service application and reduce said quick action chamber pressure to a predetermined value to establish a following available emergency application.

4. In an automatic air brake, in combination, a brake cylinder, a quick service chamber, constantly coacting with the brake cylinder, means responsive to brake pipe reduction for charging the quick service chamber with a definite volume of air under pressure for propagating quick service application, means for conducting said definite volume into the brake cylinder to minimize brake cylinder leakage, and triple valve means coacting with the second named means for releasing said definite volume from the brake cylinder.

5. In an automatic air brake, in combination, a brake pipe, a brake cylinder, an auxiliary reservoir, adapted to be charged with fluid under pressure from the brake pipe, a deplete valve device, and a triple valve assembly comprising a main slide valve, an auxiliary slide valve superimposed thereupon, a piston subjected on one side to auxiliary reservoir pressure and subjected on the other side to brake pipe pressure, operative upon a light quick service reduction in brake pipe pressure for causing said main valve to connect the auxiliary reservoir with the brake cylinder for a quick service application and simultaneously open a connecting passage from said auxiliary reservoir to a deplete valve chamber, whereupon reservoir pressure is present in said passage and chamber, said deplete valve device in combination with said triple valve assembly, having a control piston, a slide valve, a seat and chamber therefor, said control piston constantly subjected to brake pipe pressure on one side and subjected on the other side to auxiliary reservoir pressure when the triple valve is in application position, a passage controlled by said triple valve and leading from said deplete valve chamber to said triple valve seat and chamber, and so positioned that in application of the said triple valve, reservoir pressure is present in said passage and chamber, a vent passage controlled by said control piston and slide valve leading from said slide valve seat and chamber to the atmosphere and so positioned that the control piston and slide valve on same side are exposed to the atmosphere in said chamber in release position of the triple valve, and yielding means responsive to brake pipe pressure for venting the auxiliary reservoir excess pressure to the atmosphere to prevent overcharged auxiliary reservoirs from causing the triple valves to slowly move into application position while the valves are in release position upon the train.

6. In an automatic air brake, in combination, a brake pipe, an auxiliary reservoir, a triple valve device responsive to brake pipe and auxiliary reservoir pressures, a quick action chamber adapted to be charged from the auxiliary reservoir, a brake cylinder, and a quick service chamber constantly coacting with brake cylinder pressure to minimize cylinder leakage, coacting means compensating for brake cylinder leakage and maintaining the brake cylinder pressure direct from the brake pipe into the brake cylinder without the brake cylinder becoming overcharged with excess pressure from the brake pipe, when operating the brakes with normal or abnormal high pressure, and coacting means for quick release of the brakes.

7. In an automatic air brake, in combination, a brake pipe, an auxiliary reservoir, a triple valve through which the auxiliary reservoir is charged, and an auxiliary automatic deplete valve device coacting with the triple valve and brake pipe pressures to vent excess pressure above normal pressure of about seventy pounds auxiliary reservoir pressure to the atmosphere and prevent accidental application of the brakes when in normal release position.

8. In an automatic air brake, in combination, a brake pipe, a brake cylinder, an auxiliary reservoir, and a triple valve device operative upon a reduction in brake pipe pressure to equalize the auxiliary reservoir pressure with the brake cylinder pressure to a predetermined value, and an automatic exhaust control valve coacting therewith, for reducing brake cylinder excess pressure, and bleeding the auxiliary reservoir, such excess pressure release being made into the brake pipe whereby to facilitate prompt brake release.

9. In an automatic air brake, in combination, a brake pipe, a brake cylinder, an auxiliary reservoir, a compensating valve, coacting with brake cylinder pressure, and a triple valve controlling the passage of auxiliary reservoir pressure to the brake cylinder and controlling passage of brake pipe pressure to the compensating valve independent of the auxiliary reservoir, emergency application of the triple valve restricting flow of auxiliary reservoir pressure to the brake cylinder and simultaneously opening the compensating valve, said compensating valve when open permitting passage of brake pipe pressure direct into the brake cylinder whereby brake pipe pressure combines with the retarded flow of auxiliary reservoir pressure into the brake cylinder to effect a light preliminary emergency application, and means coacting with the triple valve to prevent a leaky auxiliary reservoir from releasing the brake, said means coacting with the triple valve and brake pipe pressure to release the brakes.

10. In an automatic air brake, in combination, a triple valve device, a quick action chamber, a brake cylinder, a brake pipe, a piston valve subjected on one side to quick action chamber pressure and subjected on the other side to brake pipe pressure, a spring on the last named side of the piston valve coacting with brake pipe pressure to hold said piston on its inward seat and the valve closed to prevent undesired quick action during service operations, reduction of brake pipe pressure permitting the valve to open and release the quick action chamber pressure, and a piston operated vent valve adapted to be opened by the released quick action chamber pressure when the first named valve is opened and permit flow of brake pipe pressure in large volume into the brake cylinder during heavy emergency application, and automatic means coacting with the said triple valve device for reducing brake cylinder excess pressure and bleed the auxiliary reservoir, such excess pressure release being made into the brake pipe whereby to facilitate quick release.

11. In an automatic air brake, in combination, a triple valve, a chamber, a brake cylinder, an auxiliary reservoir, a brake pipe, a control piston having a valve and chamber therefor, said control piston valve in release position permitting return of pressure from the chamber to the brake pipe to permit the said valve to reduce pressure to a predetermined value to move to application position to set the brake, a check valve permitting an increase of brake pipe pressure to flow into the chamber and brake cylinder to compensate for cylinder leakage to apply or release the brake, and a reducing port controlled by the control piston valve for reducing pressure to a predetermined value from the chamber and brake cylinder into the brake pipe, to coact with the triple valve for protecting a leaky auxiliary reservoir from releasing the brake, and prevent waste of brake cylinder pressure by repeated reductions and increases of brake pipe pressure before the auxiliary reservoirs are recharged during critical brake operations.

12. In an automatic air brake, in combination, an emergency valve constantly stabilized, a piston vent valve and constant means for stabilizing said piston independent of the vent valve, stabilizing means to prevent undesired emergency action when operating the brakes with quick service and service applications, and coacting means to release the brakes.

13. In an automatic air brake, in combination, a brake pipe, a brake cylinder, an auxiliary reservoir, a compensating valve coacting with brake pipe pressure, and means in the full service and emergency application position of the brakes for restricting the flow of pressure from the auxiliary reservoir to the brake cylinder and simultaneously opening the compensating valve, thus permitting passage of a larger volume of brake pipe pressure direct into the brake cylinder, providing a greater emergency application, whereupon said compensating valve automatically reduces brake cylinder application excess pressure into the brake pipe to facilitate prompt release.

ALVA L. GOODKNIGHT.